2,731,596

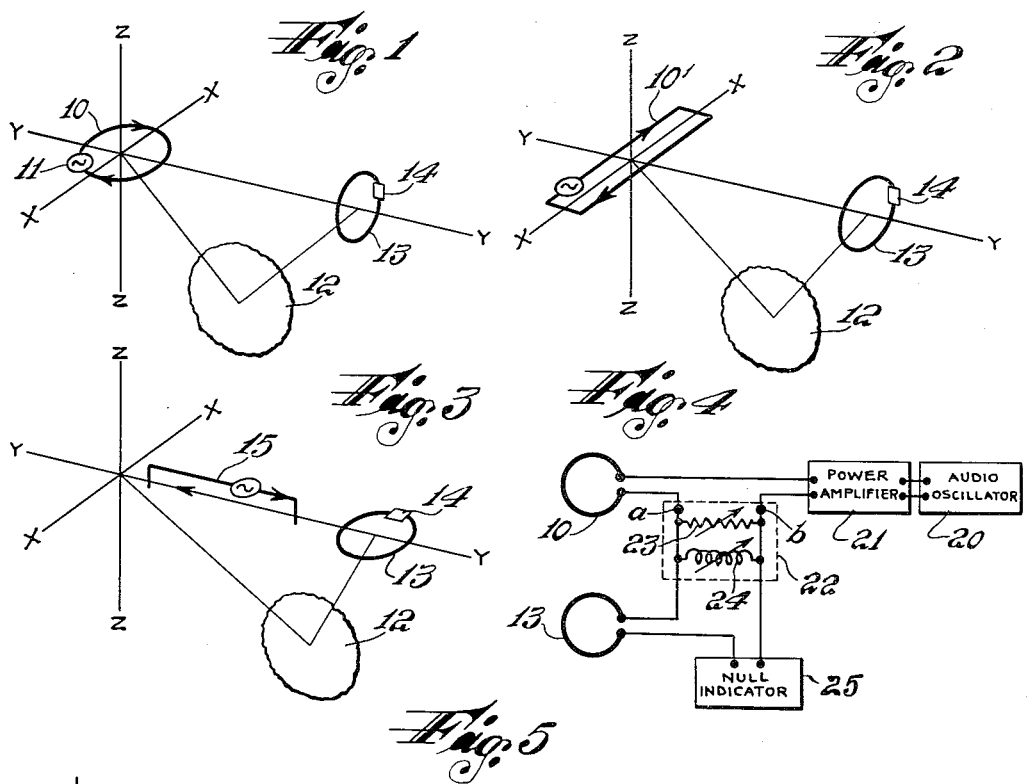
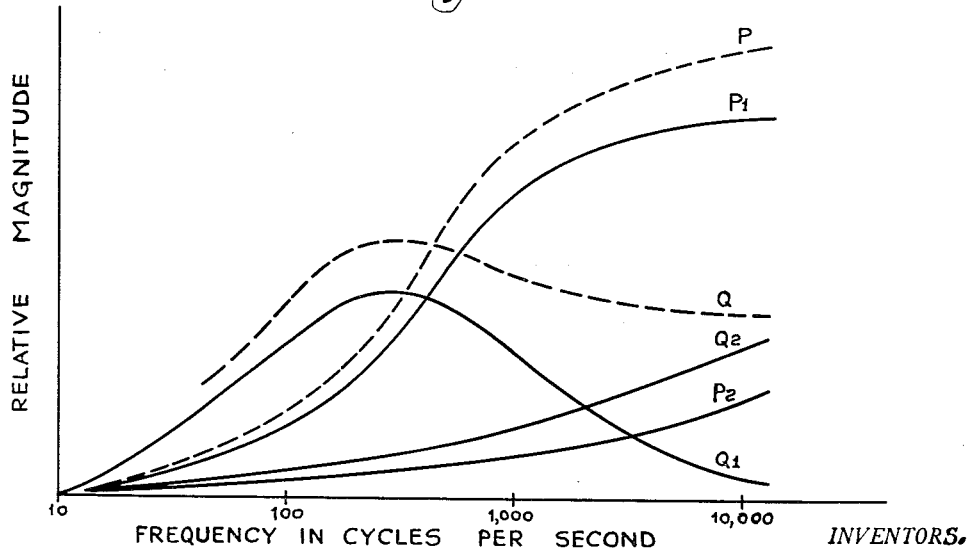
INVENTORS.
James R. Wait
Arthur A. Brant
BY
Taylor, Cifelli & Jurick
ATTORNEYS United States Patent Office 2,731,596
Patented Jan. 17, 1956

METHOD AND APPARATUS FOR GEOPHYSICAL EXPLORATION

James R. Wait, Jerome, and Arthur A. Brant, Clarkdale, Ariz., assignors to Newmont Mining Corporation, New York, N. Y., a corporation of Delaware Application February 21, 1952, Serial No. 272,734

12 Claims. (Cl. 324—6)

This invention relates to geophysical exploration and more particularly to a novel method for determining the presence of sub-surface mineralization.

Various methods have been proposed whereby the presence of sub-surface mineralization can be ascertained. In general, the practical scope of usefulness of a given process depends upon the extent to which certain interfering phenomena can be eliminated or balanced out of the field observations being made over a selected region of ground. In addition to determining the mere presence of mineralization within a given test region it is essential to determine the relative density and extent of the mineralization to a degree of certainty such as will warrant undertaking drilling. In this respect our novel method of exploration affords certain practical advantages over known methods, which advantages will become apparent hereinbelow.

Essentially, our method of exploration comprises setting up a magnetic field, having a sinusoidal variation with time, by means of an insulated loop of wire disposed on the surface of the earth in the region in which knowledge of the sub-surface condition is desired. Such primary field induces a circulating current to flow within the earth, which current is measured by a second similar loop of wire. The behavior of the current flow, as a function of the frequency of the primary field, is characteristic of the size and conductivity of the sub-surface conducting ore body. The method, to be described in detail hereinbelow, is of particular utility in locating massive sulphide bodies, as distinguished from scattered sulphides, it being known that metallic minerals are usually found in nature in the form of sulphides.

An object of this invention is the provision of a novel method of geophysical exploration for the detection of massive sulphide occurrences.

An object of this invention is the provision of a method of determining the presence and approximate size of sub-surface mineralization by observing the behavior of currents induced within a closed loop as a function of a primary field of varying frequency impressed through the earth in the region of such loop.

An object of this invention is the provision of a method of determining the presence of sub-surface massive sulphide occurrences said method comprising placing a loop of wire on the earth's surface in the region to be investigated, applying a sinusoidal charging current flow through the loop, measuring the resultant voltage in an insulated pick-up loop disposed within the field of influence of the charging current, varying the frequency of the charging current within a selected frequency range, and observing the behavior of the resultant voltages as a function of the charging current frequency.

An object of this invention is the provision of a method for establishing the sub-surface presence of a massive sulphide ore zone by measuring the steady state transfer impedance between the charging current flowing in a primary loop and the resultant voltage induced in an insulated pick-up loop disposed within the magnetic field of influence of the charging current.

An object of this invention is the provision of a method for establishing the sub-surface presence of a massive sulphide ore occurrence said method comprising placement of a primary loop of wire in the region to be investigated, impressing a sinusoidal charging current of known frequency through the primary loop and through a parallel network including a calibrated resistor and inductor, placing a pick-up loop within the magnetic field of influence of the charging current, bucking the voltage induced in the pick-up loop against the voltage drop appearing across the parallel network, adjusting the value of said calibrated resistor and inductor to establish an exact balance between the two bucking voltages, altering the frequency of the charging current within a range of 10 to 1,000 cycles, and readjusting the calibrated resistor and inductor to again establish an exact balance between the bucking voltages.

These and other objects and advantages will become apparent from the following description when taken with the accompanying drawings illustrating the practice of the invention. It will be understood the drawings are for purposes of illustration and are not to be construed as defining the scope or limits of the invention, reference being had for the latter purpose to the appended claims.

In the drawings wherein like reference characters denote like parts in the several views:

Figure 1 is a diagrammatic representation intended to illustrate the broad principle of our invention;

Figures 2 and 3 are modifications of the Figure 1 representation;

Figure 4 is a diagrammatic representation illustrating apparatus for use in the field; and Figure 5 is a set of curves showing the variations of the in-phase and out-of-phase components of transfer impedance, between the two loops, as a function of the charging current frequency.

Reference is now made to Figure 1 in which a right-handed Cartesian coordinate system is used as a reference with the surface of the ground coinciding with the X—Y plane. A small, insulated, circular loop 10, of N turns of wire, is contained in the ground plane with the loop axis coinciding with the indicated Z axis. The loop 10 connected to a generator 11 producing a sinusoidal current of continuously adjustable frequency within a range of 10 to 1,000 cycles per second. Such generators are well-known in the art and comprise an audio frequency oscillator followed by a suitable power amplifier. For present purposes, the generator is capable of delivering an alternating current up to several amperes without distortion. The magnetic field of the loop 10 penetrates, within rock of average conductivity to a depth of the order of 500 feet with less than 10 percent attenuation in addition to the normal spreading of the magnetic flux, from such a loop, in air. The magnetic field of the loop causes currents to flow in orbital paths within a highly conducting ore body 12 situated below the ground surface with its center somewhere below the loop 10. As is well established by laws of electromagnetic induction, the magnitudes of the currents flowing within the ore body are determined by the conductivity of the body. For low frequencies, the induced currents flowing in the ore body will increase in direct proportion to the frequency of the current flowing in the loop 10 and such currents will be 90 degrees out of phase with the primary loop current. As the primary loop current frequency is increased, however, the mutual interaction (that is, the mutual inductance) of the circulating current filaments within the body 12 has a tendency to reduce the magnitude of these induced currents and to retard them further in phase relative to the primary loop current. In the limiting case at relatively high frequencies, these secondary, or induced, currents flow entirely on the surface of the conducting ore body.

The magnetic field, produced on the earth's surface by the induced currents circulating in the sub-surface ore body, is measured by a second, insulated, circular pick-up loop 13. The orientation of the pick-up loop 13 should always be such that it is not affected by the direct field of the primary loop 10. Thus, the plane of the loop 13 should be either in the XZ or YZ plane. However, it is preferable to place the coil 13 in the YZ plane as everywhere in this plane no direct field will result in the loop no matter what elevational differences exist between the loops 10 and 13. When placed in the XZ plane, the loop 13 would be free of a direct field only when the center of the loop is at the same elevation as the loop 10. With this configuration of the two loops the normal magnetic field of the primary loop 10, as measured by the pick-up loop 13, is at a minimum. Such voltage as is developed in the pick-up loop 13 is directly proportional to the primary loop magnetic field component along the X coordinate. The actual magnitude of the voltage developed across the loop 13 is relatively very small or absent when the conducting ore body 12 is not present. However, when there is present a sub-surface sulphide or body of relatively high conductivity (say a resistivity of $10^{-2}$—1 ohm metres) and whose dimensions are of the order of a hundred feet at a depth not exceeding 500 feet, the voltage induced in the pick-up loop is significant and readily measurable by a sensitive, voltage measuring device 14.

Figure 2 illustrates a modification of the Figure 1 arrangement. Here we employ a slender, rectangular primary coil 10' contained in the XY plane and the secondary fields are measured by the pick-up loop 13 oriented in the YZ plane. The principle of operation is the same as that described with reference to Figure 1. We have found that the rectangular primary loop is preferred if the ore body is at a relatively greater depth or is extensive in the X direction.

Another variation of the loop arrangements is shown in Figure 3. In this case the primary magnetic field conveniently is set up by passing a sinusoidal current through a straight, insulated wire 15 that is grounded at each end. For convenience the wire lies along the Y axis of the coordinate system and the secondary magnetic field, due to the induced currents that flow within the ore body 12, is measured by the small circular loop 13 whose center is on the Y axis and whose plane is contained in the XY plane. In this particular arrangement the secondary, vertical magnetic field in the receiving loop 13 and the voltage induced in such loop is zero if the sub-surface regions are symmetrical about the YZ plane. From this fact it follows that this array is highly useful if uniform conducting horizontal strata, near or below the earth's surface, are to have a negligible effect on the secondary response. It is here pointed out that in this case a maximum response from a localized ore body (such as the body 12) is obtained if the center of the body is on one side or the other of the ZY plane.

In each of the above arrangements, the measurement can always be reduced to one that measures the mutual or transfer impedance between the two pairs of terminals of the two insulated loops, the primary loop, in the third case, being the grounded cable.

The practical object of our novel method of geophysical exploration is to define a sub-surface, massive, sulphide, conducting ore zone having an approximate resistivity $10^{-2}$—1 ohm meters and differentiate such zone from the generally-present response of surface soil water and alluvium conductors which vary in resistivity from 10–100 ohm meter. At fixed frequencies in the region of 1000 cycles (as generally used in prior exploration methods) the response of such soil water and alluvium conductors is as large as, and inseparable from, the response due to the sulphide mass.

Reference is now made to Figure 4 for a description of the actual practice of our invention in the field. The current source comprises an audio frequency oscillator 20 followed by a power amplifier 21. The oscillator output is continuously variable in frequency within a working range of 10 to 1,000 cycles per second and the amplifier is capable of delivering an undistorted current output of at least one ampere. The primary loop 10, comprising anywhere from 1 to 100 turns of insulated wire wound on a circular frame of about 5 feet diameter, is connected across the amplifier output in series with a standard impedance 22, the latter consisting of the parallel-connected resistor 23 and inductor 24, each adjustable in values over wide limits. The impedance presented by the terminals $a$, $b$, should be adjustable in resistance magnitude from milliohms to kilo-ohms and the phase of the voltage drop across the impedance 22 (due to the primary current) should be adjustable from 0 to 90 degrees with respect to the voltage induced in the coil 13 and applied in opposition. The secondary field, developed at the earth's surface as a result of circulating currents induced in a conducting ore body (as, for example, the body 12 of Figures 1, 2 or 3) induces a voltage in the pick-up loop 13, oriented as has already been described. The voltage induced in the loop 13 is impressed across the impedance 22, in opposition to the voltage drop developed thereacross by reason of the current flowing in the primary loop 10. A null indicator 25, such as a vacuum tube voltmeter, is employed to determine when the resultant voltage appearing across the standard impedance 22 balances out in both phase and magnitude the voltage induced in the pick-up loop 13. The indicator 25 should be quite sensitive and tunable to the particular frequency of the current flowing within the primary coil 10. For a given frequency, the impedance 22 is adjusted until the null indicator 25 indicates zero resultant voltage between the voltage developed in the pick-up coil 13 and that appearing across the impedance 22 by reason of the current flow therethrough. Such impedance adjustment involves an adjustment of the resistor 23 and the inductor 24 as a true null condition does not prevail unless the voltage magnitudes and phase relationships across the impedance 22 and the coil 13 are exactly equal and opposite. In this way the complex transfer impedance between the loops 10 and 13 is obtained directly. Transfer impedance is defined as the voltage drop across one pair of terminals divided by the current flowing between a second pair of terminals in the same circuit. It follows that the complex impedance Z at a primary current frequency $f$, is equal to the transfer impedance between the current $I(\omega)$ in the primary coil 10 and the voltage $E(\omega)$ across the pick-up coil 13 and is expressed as:

$$Z(\omega) = \frac{jR\omega L}{R + j\omega L}$$

where R is the value of the resistor 23 in ohms for the frequency $(f)$ and L is the value of the inductor 24 in henries at such frequency. Here $\omega = 2\pi f$.

The quantity Z, at a specific frequency $(f)$, may be expressed in terms of a real and an imaginary part:

$$Z(\omega) = P(\omega) + jQ(\omega)$$

In the above expression, $P(\omega)$ is the in-phase component since it is related to the component of the induced voltage in the pick-up loop which is in phase with the current $I(\omega)$ in the primary loop. On the other hand $Q(\omega)$ is related to the out-of-phase component (that is, the quadrature of 90 degree component) of the induced voltage relative to the phase $I(\omega)$ in the primary loop.

In terms of the resistance and inductance values of the standard impedance 22, the values of P and Q, for a frequency $f$ (where $\omega = 2\pi f$) are given by:

$$P(\omega) = \frac{R(\omega L)^2}{R^2 + (\omega L)^2}$$

$$Q(\omega) = \frac{R^2 \omega L}{R^2 + (\omega L)^2}$$

$$\frac{P(\omega)}{Q(\omega)} = \frac{\omega L}{R}$$

When the sub-surface ore body is highly conductive, relative to its surroundings, the resulting functions $P(\omega)$ and $Q(\omega)$ are relatively large in magnitude compared to any response of the surrounding material. The nature of the variations in P and Q, as a function of frequency, are shown in Figure 5. For a physical understanding of these functions the curves are broken down into two parts. The curves $P_1$ and $Q_1$ are the in-phase and out-of-phase responses respectively, due to the conducting ore body of some shape which is approximated by a sulphide sphere having a resistivity of approximately $10^{-2}$ ohms meter. The curves $P_2$ and $Q_2$ are similar responses due to a poorer, though still conducting, surface region having a resistivity of approximately 10–100 ohms meter and which is also within the field of influence of the primary magnetic field. The resultant curves P and Q are the respective sums of the $P_1$, $P_2$ and $Q_1$, $Q_2$ curves and such resultant responses are measured directly by the setting of the variable resistor 23 and inductor 24 of the standard impedance 22, shown in Figure 4.

The analysis of the resultant functions P and Q is not hindered seriously by the masking effect of the added responses $P_2$ and $Q_2$, of the relatively poor conducting region associated with the ore body, since the variation of $P_2$ and $Q_2$, with frequency, is gradual whereas for a good size, massive sulphide occurrence $P_1$ rises sharply (and $Q_1$ reaches a maximum value) at the lower frequencies. This fact is important diagnostically. In general, only one frequency around 1,000 cycles per second is used and only P or $\sqrt{P^2+Q^2}$ is measured. It is not possible to tell from a single frequency point whether sulphides, surface conductors, or both are active. Even the diagnostic ratio of $$\frac{P}{Q}$$

is fairly constant at 1,000 cycles and above. However, from the value of $$\frac{P}{Q}$$

at a given low frequency where both $P_1$ and $Q_1$ have significant values for sulphides, or from a frequency response curve of $$\frac{P}{Q}$$

(or P and Q) the presence of sulphides can be diagnosed and the size of the sulphides determined.

By judicious relative orientation of the primary and secondary coils the direct coupling, i. e., the direct induced voltage between these coils (when no underground conductor is present) can be reduced to zero. For example, the primary coil may be oriented with its turns in a horizontal plane and the secondary coil with its turns in a vertical plane. Also, the primary coil may be oriented with its turns in a vertical plane and the secondary coil with its turns in a horizontal plane and exploratory lines may be run on the surface either in or perpendicular to the plane of the primary coil. In either of the systems the voltage developed in the secondary coil is due entirely to the electromagnetic field arising from the induced eddy currents in some underground body having a high conductivity. This we may call the anomalous or secondary voltage and at the pick-up coil the anomalous voltage will be equal to the anomalous electromagnetic field multiplied by $2\pi f$, where $f$ is the frequency of the current used.

This anomalous voltage due to some highly-conducting underground body, if expressed as a fraction of the primary field at the point of observation, is equal to $K(P+jQ)$ multiplied by $$\frac{a^3}{d^3}$$

for a sphere, or $$\frac{a^2}{d^2}$$

for a cylinder, or $$\frac{b}{d}$$

for a tabular or dyke-like body, where:

$a$ is the radius of the sphere of the cylinder,
$b$ is the thickness of the tabular or dyke-like body,
$d$ is the depth to the body center or upper surface,
$P+jQ$ are functions of the frequency used and the conductivity and dimensions, $a$ or $b$, of the bodies, i. e., for a given conductivity they are functions of frequency and the size of the bodies. These terms are exactly the P and Q referred to hereinabove.
K is a numerical factor which is determinable for any observation point relative to the location of the body.

In general a reconnaissance of an area is first carried out using a given single frequency. Where any anomalies occur, the area and shape enclosing the associated anomalous readings on a plan map, together with the known geology, will immediately show whether the anomalous conducting body is approximatable by a sphere, cylinder or dyke-like body.

The next step is to bring the primary coil within about 400 feet of the location of the center of the anomalous area or body. The secondary coil is set up relative to the body at a location for which the numerical factor K is known and for which a good anomalous value should result.

Observations are then made at a series of frequencies, e. g., 10, 30, 100, 300, 1000 and $R(\omega)$ and $L(\omega)$ measured as by the circuit of Figure 4.

For a spherical body the in phase anomalous voltage $$= KP \frac{a^3}{d^3}$$

and the out of phase anomalous voltage $$= KQ \frac{a^3}{d^3}$$

The ratio of the in phase to out of phase voltage for any shape anomalous body is $$\frac{P(\omega)}{Q(\omega)} = \frac{\omega L}{R}$$

see above.

L may be calibrated on its dial directly for $\omega L$ at the frequencies used, i. e., at 30, 100, 300 and 1,000 cycles while R is calibrated directly in ohms. Thus, the ratio $$\frac{\omega L}{R} = \frac{P(\omega)}{Q(\omega)}$$

may be read directly from the dial settings on the resistance 23 and inductance 24.

There are several ways in which to use this ratio to give the size of the conducting body directly.

For a spherical conducting body the ratio $$\frac{\omega L}{R} = \frac{P(\omega)}{Q(\omega)} = 1$$

when $(\sqrt{\sigma f})a = 1200$, where:

$\sigma$ is the conductivity of the body in mhos per meter,
$f$ is the frequency used,
$a$ is the radius of the presumed spherical body, in meters, and $\omega = 2\pi f$.

Since the conductivity of a massive sulphide body is, on the average, 10 mhos per meter, the factor $(\sqrt{f})a=380$. We need, then, but vary the frequency until $$\frac{\omega L}{R} = \frac{P}{Q} = 1$$

whence, $a$, the radius of the spherical conducting massive sulphide body $$= \frac{380}{\sqrt{f}}$$

meters.

Similarly, if the body is a flat-lying cylinder or ore lens of massive sulphide, $$\frac{\omega L}{R} = \frac{P(\omega)}{Q(\omega)} = 1$$

when $(\sqrt{\sigma f})a = 340$ and $(\sqrt{f})a = 110$ whereby $a = \frac{110}{\sqrt{f}}$ meters.

If the body is a more or less steeply dipping dyke or vein of massive sulphide, as is frequently the mode of occurrence, then $$\frac{\omega L}{R} = \frac{P(\omega)}{Q(\omega)} = 1$$

when $(\sqrt{\sigma f})b = 200$ whereby $$b = \frac{60}{\sqrt{f}}$$

Thus, we have provided a simple, convenient method of determining the size of a sub-surface massive sulphide body of average conductivity 10 mhos per meter (100–1 mho per meter range).

First, from the areal distribution of anomalous readings at a single reconnaissance frequency we know whether the anomalous body is of spherical, flat cylinder or dyke form.

Second, from observations at a series of frequencies at a single given station near the maximum reconnaissance anomaly we determine the size of the anomalous body. We observe the ratio $$\frac{\omega L}{R} = \frac{P(\omega)}{Q(\omega)}$$

at the series of frequencies. Where the ratio is equal to 1, the radius, $a$, of the approximately spherical body is equal to $$\frac{380}{\sqrt{f}}$$

meters.
If the ratio $$\frac{P}{Q}$$

for a given frequency, is greater than 1, we know we are on the high side of the frequency and the above relation gives a value for, $a$, that is too small. Similarly, if $$\frac{P}{Q}$$

for a given frequency is less than 1, we are on the low side of the frequency and the value, $a$, will be too great.

Thus, it will be apparent that the size of the body is directly determinable when we use the lower frequencies, in the 10–1000 cycle range, and a sequence of frequencies. An advantage of the use of a sequence of frequencies is to differentiate between sulphide anomalies and the effects of surface conductors. At the lower frequencies, below 10 cycles, P and Q are substantially equal and the ratio of $$\frac{P}{Q}$$

is somewhat less than (1) but remains fairly constant and, therefore, the ratio at such frequencies is not diagnostic. On the high side (1,000 cycles and up, i. e., well above the frequency where $P=Q$), Q is small and P is flat and the ratio $$\frac{P}{Q}$$

is fairly constant and, again, not diagnostic.

If the frequency is too high, as for example about 1,000 cycles and there is present a moderately conducting surface conductor, the response of such surface conductor, due to such higher frequencies, will produce significant values of $P_2$ and $Q_2$ which values rise with frequency even though the surface conductor is a thousand fold poorer conductor than the sulphides. If, now, to these values is added the response of the anomaly due to a deep sulphide, specifically, $$\frac{P_1}{10}$$

and $$\frac{Q_1}{10}$$

see Figure 5, the resultants, at these higher frequencies, are $$Q = Q_2 + \frac{Q_1}{10}$$

which is greater than $$P = P_2 + \frac{P_1}{10}$$

and such conditions do not permit the recognition of the presence of the sulphides.

If, however, a frequency run is made from 1000 to 10 cycles, $Q_1$ will be rising toward the lower frequencies and $P_1$; $P_2$ and $Q_2$ will be dropping until that a maximum in Q and an inflection in P is obtained. Either one of these factors (maximum Q or inflection in P) are significant as an indication of the point where $P=Q$ and $$\frac{P}{Q} = 1$$

Knowing the frequency at which $$\frac{P}{Q} = 1$$

we can derive the size of the sulphide body from the relations given above. It may here be pointed out that for any reasonable sized surface conductors which heretofore have given confusing anomalies, $$\frac{P}{Q}$$

will be less than one (1) at the lower frequencies, say, 10–300 cycles. Consequently, by the use of a series of frequencies between 10–1000 cycles per second the anomalies resulting from large scale surface conductors may be eliminated.

From the above description it is apparent that our method of geophysical exploration is based upon the observance of the steady state transfer impedance characteristic which is equal to the complex ratio between a secondary voltage induced in an insulated pick-up loop and the complex current flowing in an associated primary loop. Such impedance characteristic cannot be measured by any system employing grounded pick-up electrodes.

While we have described our novel method and associated apparatus for determining the sub-surface presence of a massive sulphide ore zone from stations on the earth's surface it will be apparent the method is adapted to explorations within a drill hole by properly orienting the primary and pick-up loops within the drill hole.

We claim:

1. Apparatus for use in making low frequency, electromagnetic, geophysical explorations and comprising a primary coil disposed in the region to be investigated; a source of alternating current connected to the primary coil and including means for varying the current frequency within the range of 10–1,000 cycles; a calibrated adjustable impedance network connected in series with the said source and primary coil, said impedance network including a calibrated resistor and reactor connected in parallel; a secondary coil spaced from the primary coil and disposed in a plane normal thereto, and a null detector, said detector and said secondary coil being connected in series across the impedance network and in a sense such that the voltage induced in the secondary coil is opposed to the voltage drop across the impedance network.

2. The invention as recited in claim 1 wherein the primary and secondary coils are loops and a line joining the centers of the loops lies in the plane of the primary loop.

3. The invention as recited in claim 1, wherein the primary coil consists of a substantially straight wire disposed in parallel, spaced relation to the earth's surface and the ends of said wire are grounded.

4. The method of establishing the presence of a subsurface massive sulphide body, said method comprising placing a primary conducting loop on the earth's surface, placing a pick-up loop at a point spaced from the primary loop and in a plane normal thereto so that no direct signal results in said pick-up loop, passing an alternating current having a fixed frequency in the range 10–1,000 cycles through the said primary loop, measuring the out-of-phase component of the transfer impedance between said primary loop and said pick-up loop, increasing the frequency of the alternating current in discrete steps within the range of 10–1,000 cycles, and measuring the out-of-phase component of the transfer impedance at each such current frequency in the primary loop, a maximum value of the out-of-phase transfer impedance component being diagnostic of the presence of a massive sulphide body in the range of the primary electromagnetic field generated by said primary loop.

5. The method of establishing the presence of a subsurface massive sulphide body, said method comprising placing a primary conducting loop on the earth's surface, placing a pick-up loop at a point spaced from the primary loop and in a plane normal thereto so that no direct signal results in said pick-up loop, passing an alternating current having a fixed frequency in the range 10–1,000 cycles through the said primary loop, measuring the in-phase component of the transfer impedance between said primary loop and said pick-up loop, changing the frequency of the alternating current in discrete steps within the range of 10–1,000 cycles, and measuring the in-phase component of the transfer impedance at each such current frequency in the primary loop, a maximum increment in the in-phase transfer impedance component per equal logarithmic frequency increment being diagnostic of the presence of a massive sulphide body in the range of the primary electromagnetic field generated by said primary loop.

6. The method of establishing the size of a subsurface massive sulphide body, said method comprising placing a primary conducting loop on the earth's surface, placing a pick-up loop at a point spaced from the primary loop and in a plane normal thereto so that no direct signal results in said pick-up loop, passing an alternating current having a fixed frequency in the range 10–1,000 cycles through said primary loop, measuring the out-of-phase component of the transfer impedance between said primary loop and said pick-up loop, changing the frequency of the alternating current in discrete steps within the range of 10–1,000 cycles and measuring the out-of-phase component of the transfer impedance at each such current frequency in the primary loop, the size of the massive sulphide body being inversely proportional to the square root of the frequency at which occurs a maximum value of the out-of-phase transfer impedance.

7. The method of establishing the size of a sub-surface massive sulphide body, said method comprising placing a primary conducting loop on the earth's surface, placing a pick-up loop at a point spaced from the primary loop and in a plane normal thereto so that no direct signal results in said pick-up loop, passing an alternating current having a fixed frequency in the range 10–1,000 cycles through said primary loop, measuring the in-phase component of the transfer impedance between said primary loop and said pick-up loop, changing the frequency of the alternating current in discrete steps within the range of 10–1,000 cycles and measuring the in-phase component of the transfer impedance at each such current frequency in the primary loop, the size of the massive sulphide body being inversely proportional to the square root of the frequency at which occurs a maximum increment in the in-phase transfer impedance per equal logarithmic frequency increment.

8. The method of establishing the presence of a massive sulphide body, said method comprising passing an alternating current through a primary coil disposed in the vicinity of the body, said current having a fixed frequency in the range of 10–1,000 cycles, measuring the in-phase and out-of-phase components of the transfer impedance between the primary coil and a pick-up coil spaced therefrom and disposed at right angle thereto so no direct pick-up from the primary coil results and changing the frequency of the alternating current in discrete steps within the range 10–1,000 cycles until the said transfer impedance components are approximately equal, the equality of the transfer impedance in-phase and out-of-phase components at a low frequency of the order of tens or hundreds of cycles being diagnostic of the presence of massive sulphides rather than the average surface conducting feature.

9. The method of establishing the presence of a massive sulphide body, said method comprising passing an alternating current through a primary coil disposed in the vicinity of the body, said current having a fixed frequency in the range of 10–1,000 cycles, measuring the in-phase and out-of-phase components of the transfer impedance between the primary coil and a pick-up coil spaced therefrom and disposed at right angles thereto so no direct pick-up from the primary coil results, changing the frequency of the alternating current in discrete steps within the range 10–1,000 cycles while measuring the ratio of the in-phase to the out-of-phase component of the said transfer impedance, the presence of sulphides being shown by the out-of-phase component being the larger at low frequencies of the order of tens to hundreds of cycles.

10. The method of obtaining the radius of a spherical, sub-surface massive sulphide body, said method comprising passing an alternating current through a primary coil disposed in the vicinity of the body, said current having a fixed frequency in the range of 10–1,000 cycles, measuring the in-phase and out-of-phase components of the transfer impedance between the primary coil and a pick-up coil spaced therefrom and disposed at right angles thereto, and changing the frequency of the alternating current in discrete steps within the range of 10–1,000 cycles until the said transfer impedance components are equal, the radius of the body, in meters, being $$\frac{380}{\sqrt{f}}$$

where $f$ is the frequency of the current at which the in-phase and out-of-phase transfer impedance components are equal.

11. The method of obtaining the radius of a sub-surface massive sulphide body having a substantially cylindrical cross-section and disposed in a substantially horizontal plane, said method comprising passing an alternating current through a primary coil disposed in the vicinity of the body, said current having a fixed frequency in the range of 10–1,000 cycles, measuring the in-phase and out-of-phase components of the transfer impedance between the primary coil and a pick-up coil spaced therefrom and disposed at right angles thereto, and changing the frequency of the alternating current in discrete steps within the range of 10–1,000 cycles until the said transfer impedance components are equal, the radius of the cylindrical cross-section of the body, in meters, being $$\frac{110}{\sqrt{f}}$$

where $f$ is the frequency of the current at which the in-phase and out-of-phase transfer impedance components are equal.

12. The method of obtaining the width of a steep, tabular, sub-surface massive sulphide body, said method comprising passing an alternating current through a primary coil disposed in the vicinity of the body, said current having a fixed frequency in the range of 10–1,000 cycles, measuring the in-phase and out-of-phase components of the transfer impedance between the primary coil and a pick-up coil spaced therefrom and disposed at right angles thereto, and changing the frequency of the alternating current in discrete steps within the range of 10–1,000 cycles until the said transfer impedance components are equal, the width of the body, in meters, being $$\frac{60}{\sqrt{f}}$$

where $f$ is the frequency of the current at which the in-phase and out-of-phase transfer impedance components are equal.

References Cited in the file of this patent

UNITED STATES PATENTS

| | | |
|---|---|---|
| 1,938,534 | Peters | Dec. 5, 1933 |
| 2,015,401 | Jakosky | Sept. 24, 1935 |
| 2,527,559 | Lindblad | Oct. 31, 1950 |
| 2,542,462 | Beard | Feb. 20, 1951 |